United States Patent [19]

Pignataro

[11] Patent Number: 5,595,263

[45] Date of Patent: Jan. 21, 1997

[54] MERCHANDIZING MEANS AND METHOD

[76] Inventor: Anthony Pignataro, 12 Livingstone Street, Thebarton, South Australia, Australia

[21] Appl. No.: 388,794

[22] Filed: Feb. 15, 1995

[30] Foreign Application Priority Data

Feb. 15, 1994 [AU] Australia ................. PM3925

[51] Int. Cl.⁶ ................. B65G 1/06; E04H 3/02
[52] U.S. Cl. ................. 186/53; 235/383; 186/55; 414/331
[58] Field of Search ................. 186/53, 55, 56, 186/57, 60, 69; 235/383; 414/268, 277, 283, 331, 787, 223, 226; 901/6, 7; 198/359, 370.01, 703, 801; 193/12

[56] References Cited

U.S. PATENT DOCUMENTS

| | | | |
|---|---|---|---|
| 1,074,387 | 9/1913 | Schwab | 198/359 |
| 1,592,931 | 7/1926 | Fritsche | 186/69 |
| 3,554,391 | 1/1971 | Goodell | 186/57 X |
| 4,073,368 | 2/1978 | Mustapick | 186/53 |
| 4,466,765 | 8/1984 | Mautino | 414/277 |
| 5,186,281 | 2/1993 | Jenkins | 186/55 |
| 5,332,363 | 7/1994 | Tanaka et al. | 414/283 |

FOREIGN PATENT DOCUMENTS

| | | |
|---|---|---|
| 456297 | 4/1991 | European Pat. Off. . |
| 4215101 | 5/1992 | Germany . |
| 2256840 | 3/1992 | United Kingdom . |
| 2254604 | 10/1992 | United Kingdom ............ 186/55 |
| 9309884 | 11/1992 | WIPO . |

*Primary Examiner*—F. J. Bartuska
*Attorney, Agent, or Firm*—Watts, Hoffmann, Fisher & Heinke Co., L.P.A.

[57] ABSTRACT

Merchandising apparatus and method wherein there is provided an upstanding hollow structure which is multi-sided and has grid walls defining a series of compartments. The structure has vertical columns surrounding it and guiding robot carriages carrying robots which can reach into the compartments, withdraw articles and place them onto a descent conveyor. The descent conveyor lowers the articles onto a transfer conveyor which transfers them to a packing station. The requirements of a customer are determined at an order station by examination of a visual display unit. The order station can be operated from within a vehicle and the customer need not leave his vehicle until the order has been packed at the packing station. Loading of the compartments of the structure is effected from a storage basement by an elevator moving through a floor opening and upwardly within the hollow structure.

2 Claims, 8 Drawing Sheets

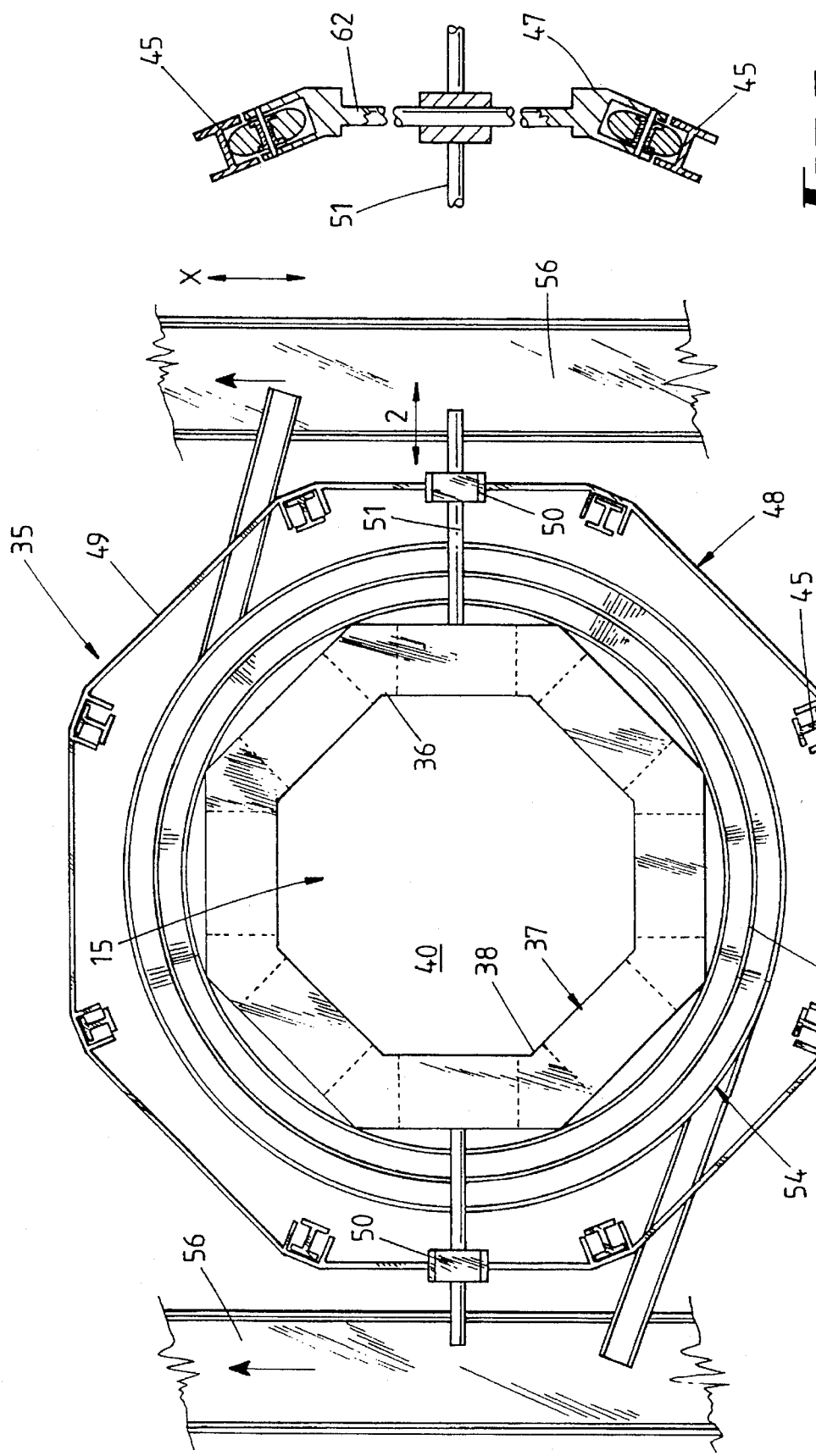

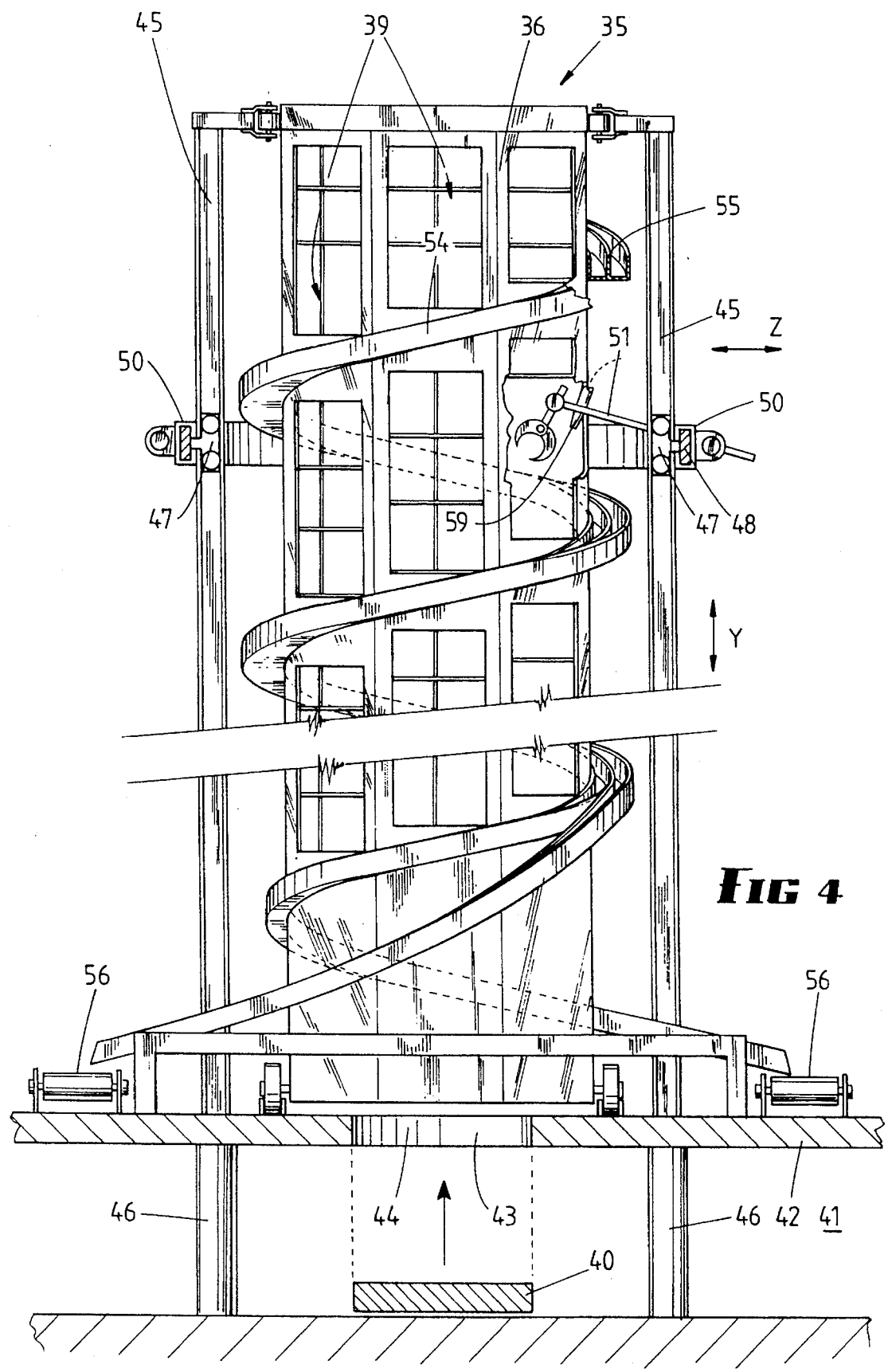

MERCHANDIZING MEANS AND METHOD

This invention relates to a merchandising means and method, and is particularly directed to achievement of rapid sales of merchandise of the type which is presently sold in a "supermarket".

The arrangement with a supermarket as commonly used, is that the store should have a large number of shelves and in some stores as many as 30,000 different items are available for sale. However, only a relatively few of those items are "fast moving" items and the fast moving items occupy most of the shelving space. They include such products as loaves of bread, eggs, milk, toilet rolls, paper towels, pet food and other items which are frequently purchased. As the shelves become empty, they are restocked by hand, and to limit the amount of labour involved it is customary to have a single shelf or bin occupying a large space but containing only one specific item, for example, one formula of pet food in a large number of tins. This arrangement results in a very bulky store space, and consequently it is sometimes difficult for a customer to locate the particular product he specifically requires. Thus it is not uncommon for the weekly shopping for goods required by a family to occupy as much as a full hour of time. This has further ramifications in that in most instances car parking is necessary, and because of the slow turn around of customers, the parking space required is excessive.

The main object of this invention is to provide a method of handling merchandise in a retail environment, which method is much quicker than the method presently used. This in turn, involves the use of novel handling devices, and the novel handling devices are associated with old and well-known handling devices but in a novel configuration.

It is known already to be old to utilise a computer network with software which will maintain a running inventory of items of merchandise as sales take place, and will identify price, and further it is known in large distribution centres (although not common in supermarkets) to load and unload pallets from storage spaces by means of robots. It is also known to use carousels for transferring products by means of conveyors, and carousels are also otherwise used in manufacturing for the various stages of manufacture of an assembly.

However, with the object of reducing labour and expediting the sales of products, the method of this invention makes it possible to provide a "drive through" floor space which is associated with a conveyor space, and the conveyor space is associated with a conveyor which extends in the direction of travel of a motor vehicle, the conveyor itself is associated with a multi-level structure having a plurality of recesses containing merchandise in an arrangement wherein the merchandise can be selected one or more items at a time, and lowered by elevating means onto the conveyor. The merchandise may be in pallets. There may be provided a plurality of product identification means, each of which can, for example, comprise a touch sensitive visual display unit, which can be scrolled by electronic means, and associated software which identifies the products available, together with an order station at which the customer can identify the products he wishes to purchase. The downstream or exit end of the assembly can be associated with a packaging and pricing station which can be in accordance with known art.

Pallet design is not standard but is specific for specific articles, and for example the pallet design for eggs and the pallet design for packs of paper towels would be very different. Some products can be handled automatically by engagement with the handling means and others need to be carried in carrier trays. All need to be in a stack which can be readily unloaded, either from the top or from the bottom. In some instances the products can be unloaded by robot directly from pallets.

The sequence of handling articles can be as follows: The pallets are loaded into their compartments in the facility or facilities (several facilities usually being required) and when a product or products are required by a customer from any one recess in the storage facility, the order is transmitted by electronic means to a robot control arrangement, and may also effect partial rotation of the storage facility (if rotatable), and identify the height of the relevant recess. A robot is then directed to the recess, and removes one or more products therefrom according to the order received. The removed products are then lowered by a descent conveyor and released therefrom onto a horizontal transfer conveyor beneath the facility, and conveyed by the transfer conveyor to the packaging area. Between the storage facilities and packaging area there can be provided additional storage means which can be operated either electrically or by hand, and which display products for sale to remind customers in case they overlooked some of their requirements. The sale is then entered and the products packed into a container and placed in the customer's vehicle without the customer needing to exit his vehicle to that stage.

For simplicity of understanding, the robots are identified as being pivotal as well as moveable in X, Y and Z directions, the conveyor from the entry point to the packaging point being regarded as an X direction, the other horizontal movement of right angles thereto is a Z direction and the vertical movement as Y direction.

While the invention need not necessarily include the abovementioned details an embodiment is described hereunder in some further detail with reference to and is illustrated in the accompanying drawings wherein:

FIG. 2 is a plan view of a storage facility, illustrating one only robot and a spiral type descent conveyor;

FIG. 3 is a partly sectioned fragmentary plan showing a linear carriage guide;

FIG. 4 is a partly sectioned elevation of FIG. 2; and,

Figure 1:
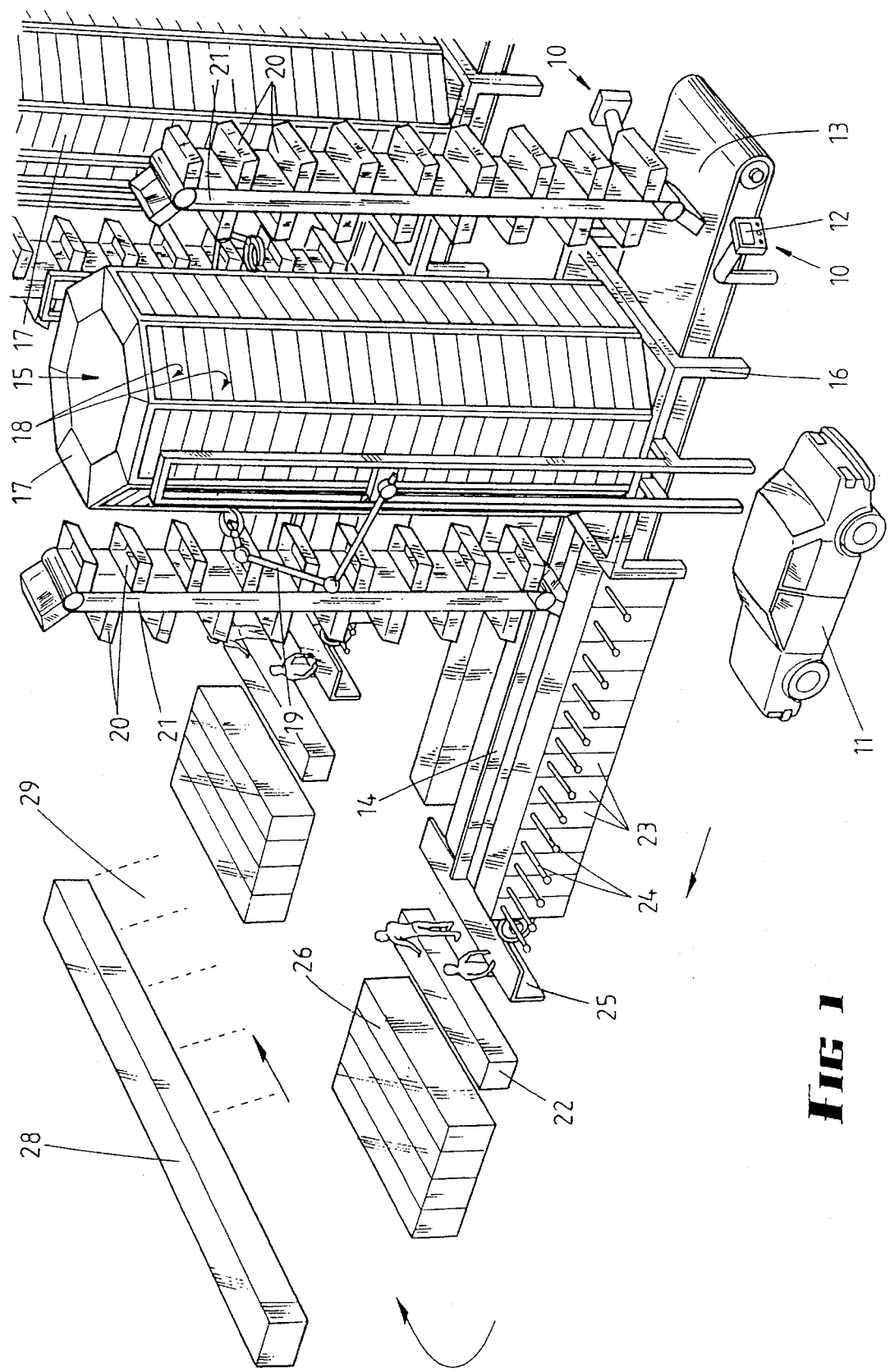
FIG. 1 is a perspective view of a lay-out according to this embodiment, but showing only two order stations.

Referring first to FIG. 1 which illustrates the principles of the invention, at an order station 10 a customer in a motor vehicle 11 can scroll through the relevant products which he may wish to purchase, these products being illustrated on a screen 12 of a visual display unit of a computer, each product identifying, for example, the brand, the ingredients of the product (if appropriate), the price, and any relevant advertising material.

There is provided a transfer conveyor 13 which in this embodiment is double width, the width being divided by a plate 14, since the invention simplifies the double sided handling of goods, that is, a second motor vehicle 11 can be located on the opposite side of the transfer conveyor 13. The transfer conveyor 13 is conveniently of a belt type which is in common use already in the food industry. In more complex installations, the transfer conveyor 13 is provided with a plurality of dividing plates 14 into a series of channels for accommodating different orders.

There are shown a pair of elevated frames 16 which straddle the transfer conveyor 13, and which support rotational storage facilities 17 which are multi-level. Saleable goods are loaded into the recesses or compartments 18 of the storage facility 17 from a central shaft 15 in which a platform may be raised and lowered by elevator means already well known in the art.

The storage facilities 17 may be circular but are preferably multi-sided much as shown in Fig t, which illustrates each having eight sides and a much larger number, perhaps 20 levels. Two such storage facilities as illustrated would handle most of the fast moving merchandise which is presently purchased by customers in supermarkets.

Removal of goods from compartments 18 is effected by robots 19 (FIG. 1) which can be of known type, for example as supplied by the firm Advanced Rapid Robotics, of Woodford, South Australia. Robots 19 can remove articles from compartments 18 and deposit them into buckets 20 of bucket type descent elevators 21 which deposit the articles in turn onto transfer conveyor 13.

Control of the robots may be simplified by rotation of the storage facilities 17, and to this effect, a turntable as illustrated in FIG. 4 may be used, or a simple bearing if the storage facilities are small.

Rotational positioning of the storage facilities 17 is best effected by computer controlled stepping motors. As an alternative, or in addition, Geneva or other known mechanisms may be used to ensure precise rotational locations for each carousel station.

It is of course a trait to overlook some item which a customer may require and as the vehicle 11 traverses from the order station 10 to the packing station 22, it passes a plurality of side by side "after thought" dispensers 23, each provided with a manually or electrically operated release device 24, and the release devices can be actuated to release respective products back to the transfer conveyor 13. The products finally discharge onto a platform 25 from which they can be transferred back onto the packing station 22 for packaging and charging to the customer.

As said above, frequently there is a requirement for very small articles, and this requirement can be met by having small articles contained in small compartments in the tertiary storage rooms 26, from which they can be removed by the operator of the packing station 22 and added to the customer's order. For larger inventories, an additional assistant may be required and the tertiary bins 26 can be much more extensive than illustrated herein.

It is a requirement of many customers to separately identify certain perishable articles such as kinds of meat, fruit, or vegetables, and for that reason the invention contemplates as an addendum the use of a perishable and refrigerated products bar 28 adjacent a parking station 29.

By utilising the arrangement which is illustrated in FIG. 1, it will be seen that two motor vehicles 11 can simultaneously move from the order stations 10 to the packing station 22 independently of one another so that the transfer conveyor 13 can perform two functions, but this can be easily increased to more order stations.

Many variations can take the place of some of the equipment described above and for example instead of the order station 10 being provided with screens 12, the order stations can simply comprise push button stations where the products can be identified numerically or by written description. To avoid confusion at the packing station 22, each customer may receive a numbered card before entry to the order station, and thereby separately identify his order from the orders of other customers. Colour coding may also be used for identification of different orders.

The description of the first embodiment in FIG. 1 can be used, not only in relatively small installations but also in large installations, but sometimes there is a requirement for an even larger installation, and in such instances the rotation of a storage facility, and the existence of two only vertical elevators place limitations of time on the flow through of customers' vehicles.

This problem is largely overcome in a second embodiment wherein the storage facility comprises a large storage structure 35 which may be circular in section but is preferably multi-sided as shown in FIGS. 2 and 4. As illustrated, the structure 35 is octagonal in plan (as in the first embodiment) comprising eight walls 36, each of which, however, is apertured to give a plurality of loading apertures 37, and the inner wall 38 comprises a plurality of relatively short vertical portions between horizontal portions giving a grid effect which establish a large number of compartments 39 loaded through apertures 37 (similar to compartments 18) defined by surfaces extending between inner and outer wall surfaces. In order to load merchandise into the apertures 37, there is provided a loading elevator 40 which may be elevated within the hollow shaft of the structure 35 and can carry merchandise upwardly in the manner of an elevator of known type. The storage area is designated 41, and this is a basement beneath the ground level, and surmounted by a floor 42 containing surfaces 43 which define an access opening 44 for the elevator 40.

Surrounding the structure 35 there are eight equally spaced vertical columns 45 which can, for example, be of I-section steel extending upwardly from the ground, supported in the basement by piers 46, and carrying on them respective elevating carriages 47 (FIG. 4), the carriages supporting an octagonal ring 48, the straight sides 49 of which form tracks for slides 50 which can move independently. The slides 50 also carry robots 51, only one of which is shown in FIG. 4.

It is not contemplated that either of the storage facilities 17 (FIG. 1) or 35 (FIG. 4) should be rotational. However robot requirements may be reduced in smaller installations, and FIG. 4 illustrates a turntable arrangement 52 which may be used for partial rotation of a smaller structure.

Between the structure 35 and the octagonal ring 48 there is located a spiral chute 54 which has a central division 55, the division dividing the chute into an inner chute and an outer chute. As described below the robots 51 will selectively deposit merchandise from the compartments 39 into the inner or outer chute portions to be either delivered to the left or right-hand linear transfer conveyor 56. In having two conveyors, the one building can service two customers at the same time, as in the first embodiment. If more than two divisions are used in the transfer conveyor, gates operate to separate orders. These are not shown.

Because there is a tendency for build up of merchandise in the chutes 54 if gravity alone is relied upon, chutes may either be provided with chains or belts which follow the spiral path and which are continually driven, or alternatively with spaced resilient rollers projecting slightly above the chute floor to ensure continuous downward passage of the merchandise.

The robots 51 and the tracks are controlled by a computer control which is illustrated in charts 1 through to 5, and described in detail below.

With both embodiments of the invention, it is possible to have driveways extending each side of the octagonal buildings or carousels, the entry portion being an "order station" equipped with an electronic visual display unit which can be programmed to select, price and compare brands, either visually or in a straightforward selection by punching in appropriate keys, which will identify which items and the quantity required. Categories and index of brands will also assist the consumer.

In order to clearly distinguish one order from another, participating customers are provided with a card. The card can be in the form of a credit card or can be individually issued to consumers. In both cases, debiting of accounts or summarising purchase bills take place via the cards.

As an alternative to an identification card, or in addition to it, use may be made of colour coding. Each robot 51 may be provided with a spray head 59 (FIG. 4), or a plurality of spray heads, which will spray a colour to the package of an article retrieved thereby, the colour being one of several, and selection of colour being made to correspond to different order stations. Alternatively, coloured tabs may be applied from dispensing heads on the robots. This arrangement reduces risk of confusion at packing station 22.

The drawings indicate a limit of two orders being dispensed, but clearly the number of order stations can be increased to, say, four, and further divisions 14 added to the transfer conveyor 56, and corresponding further divisions 55 added to the spiral chute 54.

Customers to the left and to the right of the towers can simultaneously proceed to order their shopping via the electronic visual display unit. Once a shopping list has been ordered, the driver can proceed to drive to the packing station where the goods are awaited to be loaded directly into cars by an attendant. At that station, entertainment may be provided.

Dispensing of merchandise from the compartments 39 (second embodiment), for example, can commence either when the robots 51 on the surrounding ring 49 are at the top, the bottom, or intermediate the top and bottom, and the computer algorithm is arranged so that the sequence of ordering is not necessarily the sequence of delivery onto the chute 54, and if for example the left hand customer has ordered products at the same time or at a time which is overlapping the products which are ordered by the customer on the right hand side, the robots can operate in an order which is most convenient to the raising and lowering of the ring 49. The ring 49 is shown as a single ring surrounding the storage structure 35, but it may be subdivided into eight independently actuated linear robot carriage guides 62, each with its own robot 51, so that the robots can operate independently at different levels, thus still further reducing time. This arrangement is illustrated in FIG. 3, and has the advantage that different robots 51 can operate in different levels simultaneously. The arrangement of FIG. 3 is particularly useful in very large installations. As in the first embodiment, the products are released onto respective transfer conveyors 56, which extend from the storage structure 35 to the packing station 22. When an order has been completed and all ordered products are already on the transfer conveyor, a "PLEASE PROCEED", "ORDER COMPLETE" or other appropriate sign can appear on the visual display unit.

There is a wide difference in dimensions of products, and the drawings are somewhat oversimplified in showing all of the compartments 39 being the same size. In practice the compartments 39 can be subdivided in some instances for smaller articles or left clear for larger articles.

Reference is now made to the charts 1 to 5, which illustrate the sequence arrangement in block diagram format.

DESCRIPTION OF FUNCTIONAL MODEL OF MERCHANDISING SYSTEM

Figure 5:
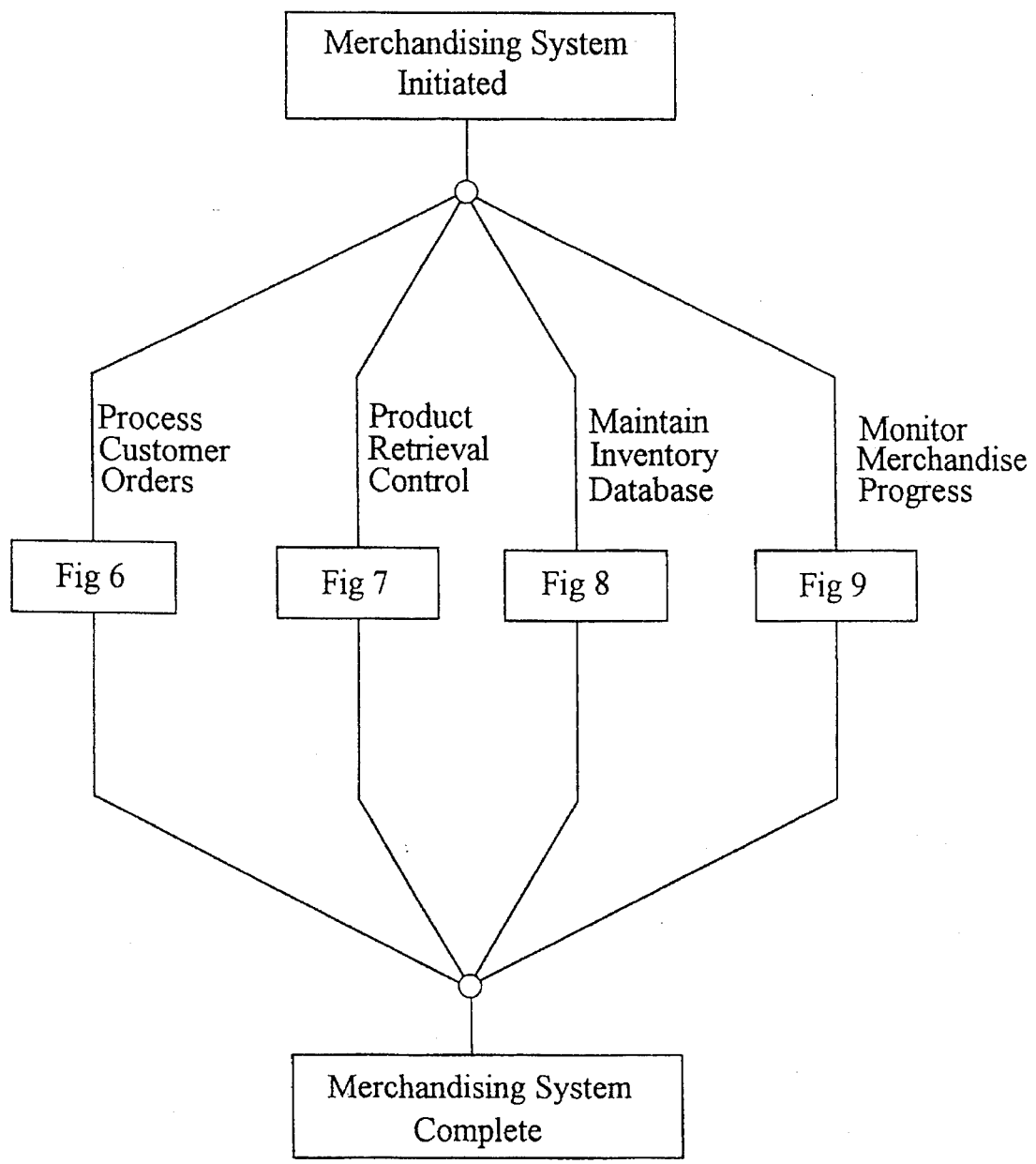
FIGS. 5–9 are flow charts which illustrate the sequence arrangement in block diagrams format.

The merchandising system comprises four main processes that occur simultaneously. These four main processes are indicated in FIG. 5 as "Process Customer Orders", "Product Retrieval Control", "Maintain Inventory Database" and "Monitor Merchandise Progress". The subsequent FIGS. (6 to 9) detail the functions of these main processes. Each of these processes will occur indefinitely as the operation of the merchandising system is to occur indefinitely and will only be halted in the event of a complete shut down of the system.

As such, the function "Merchandising System complete" will not occur in the normal flow of operations and represents the halting or shut down of the complete system.

Each of the main processes communicate via the use of messages (detailed by the use of round cornered boxes) which may have multiple sources and/or destinations. Messages may trigger an action to occur or may be the source of information which the receiving function will use at a later time. Indefinite loops that occur by default without evaluation of any criteria are annotated with the word "Loop".

Figure 6:
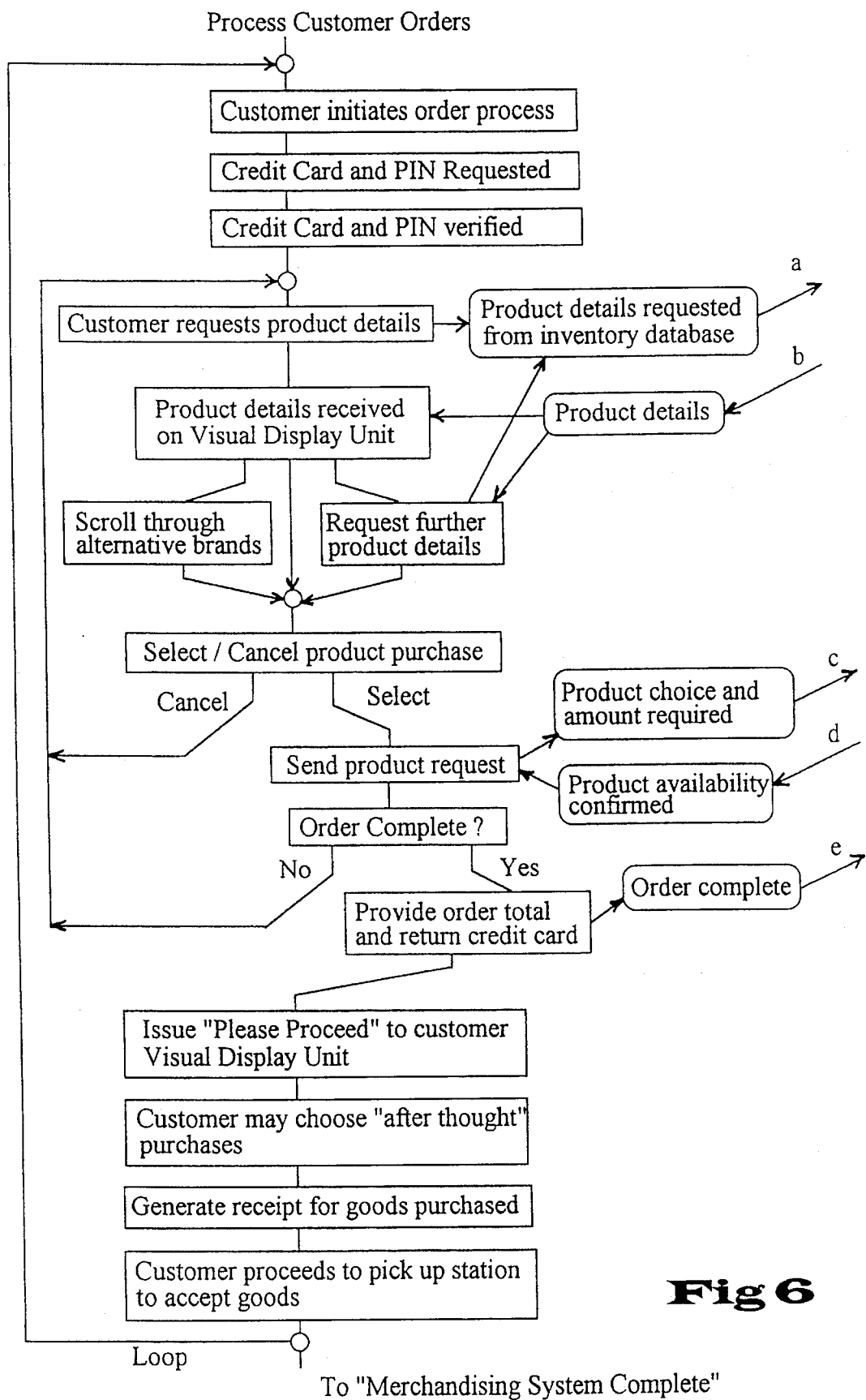

In processing a customers order (refer FIG. 6), the process is started by a customer initiating the order process. Having initiated the process the system will request the customers credit card and Personal Identification Number (PIN). The system will then verify the PIN against the credit card. From this point, the customer starts the selection process of the goods that they wish to purchase. Having requested details of a particular product via the visual display unit (VDU), a message is sent to the database inventory process requesting the information. The customer waits for the information to be retrieved from the inventory database and displayed on the VDU. Upon presentation of the product details, the customer may then choose to either scroll through the various brands offered, request further details regarding the chosen product or continue with the ordering process. At this stage the customer is required to make a decision regarding the product that they have requested detailed information on. If the customer chooses not to select this product for purchase then the system loops back to enable the customer to request details of further products. If however, the customer chooses to purchase the product selection then a message is sent to both the "Product Retrieval Control" process and the "Maintain Inventory Database" process regarding the product chosen and the amount of the product required by the customer. At this stage the customer waits for the inventory database to confirm the availability of the chosen product provided by a return message from the inventory database process. The system then prompts the customer as to whether the order is complete. If the customer wishes to purchase further products then the system loops back to enable the customer to request details of further products. If the order is complete .then a message is sent to the inventory database process indicating the completion of the order. The customer is the requested by the system to proceed to the pick up area. Having completed the order, the customer may choose "after thought" purchases in proceeding to the pick up area. The system will then generate a receipt for all of the goods purchased and the customer collects their purchases from the pick up area.

The system will then unconditionally loop back to the start of the customer order process and wait for the next customer to initiate another order process.

Figure 7:
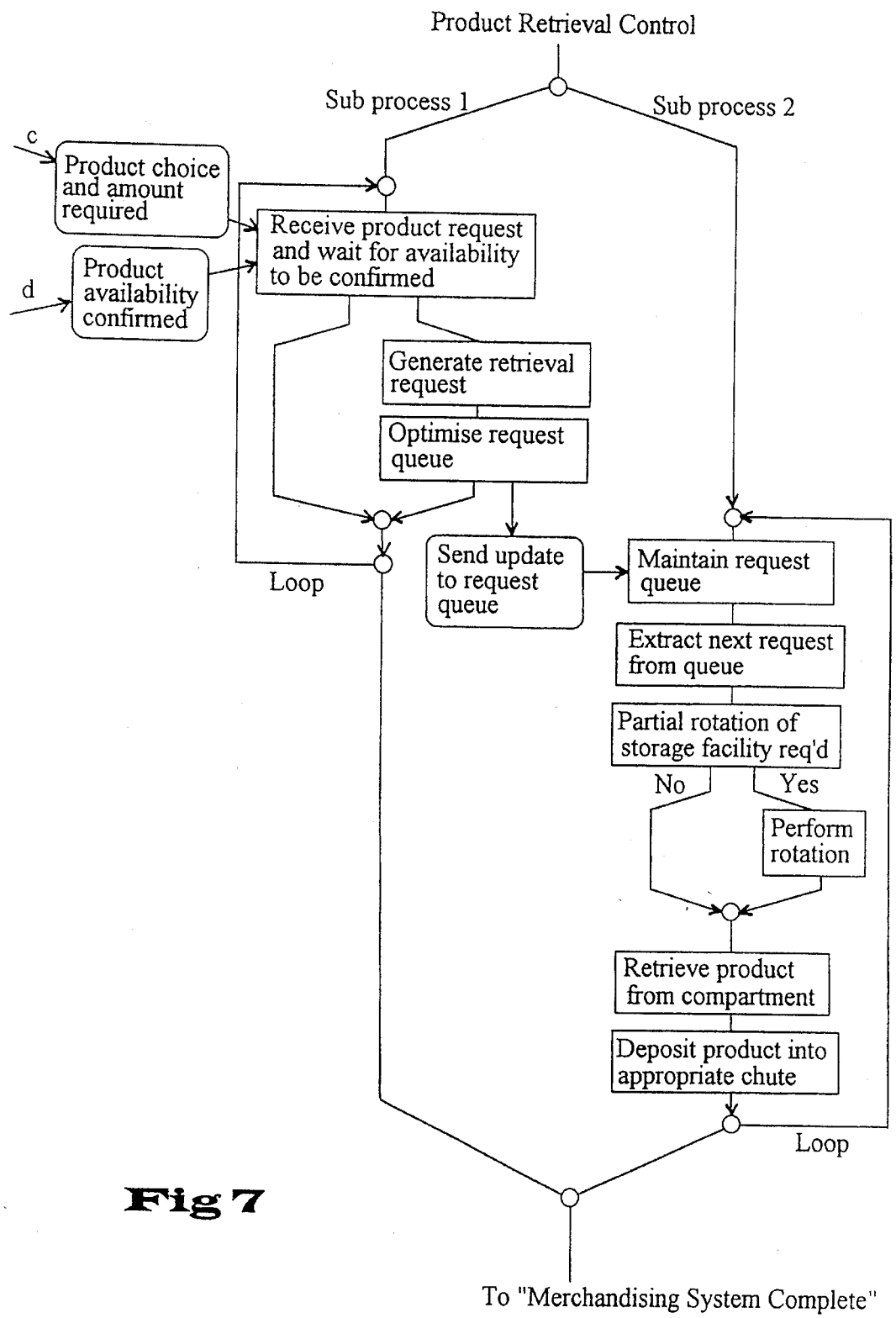

The process "Product Retrieval Control" as detailed in FIG. 7 represents the process that controls the retrieval of products by the robotic arms. This process consists of two sub processes that also occur simultaneously. The process detailed as sub process 1 waits for product selections from the customer order process and product availability information from the inventory database process. A product selection message will always have a corresponding message indicating the product availability since the product selection message indicating the product choice and the amount required is simultaneously passed to the inventory database process and will cause a returned message from the inventory database confirming availability.

If the product is not available then sub process 1 will loop back and await further product requests and their corresponding availability confirmation. If however, a valid request was received and the goods were confirmed as being available then a retrieval request is generated. This retrieval request is then considered taking into account all of the previous requests that have not yet been fulfilled. The queue of requests are then optimised with respect to the arrangement of the robotic arms to minimise the time taken to retrieve all of the goods requested. The optimised queue of requests is then sent to sub process 2 (via the message "Send update to request queue") for the control of the robotic arms and the retrieval of the required goods. Sub process 1 will then unconditionally loop back to receiving customer order requests and confirmations.

Sub process 2 waits for updates to the request queue from the first sub process. Having received an updated request, the queue is maintained. At the next stage, the first request from the queue is extracted. The retrieval request is then analysed to establish the requirement of a partial rotation of the storage facility. If a partial rotation is required then it is performed. The appropriate robotic arm is then requested to retrieve the products from the storage compartment and the goods are then deposited into the appropriate chute. At this stage, sub process 2 then loops unconditionally back to maintaining the request queue and reception of updates to the request queue.

Figure 8:
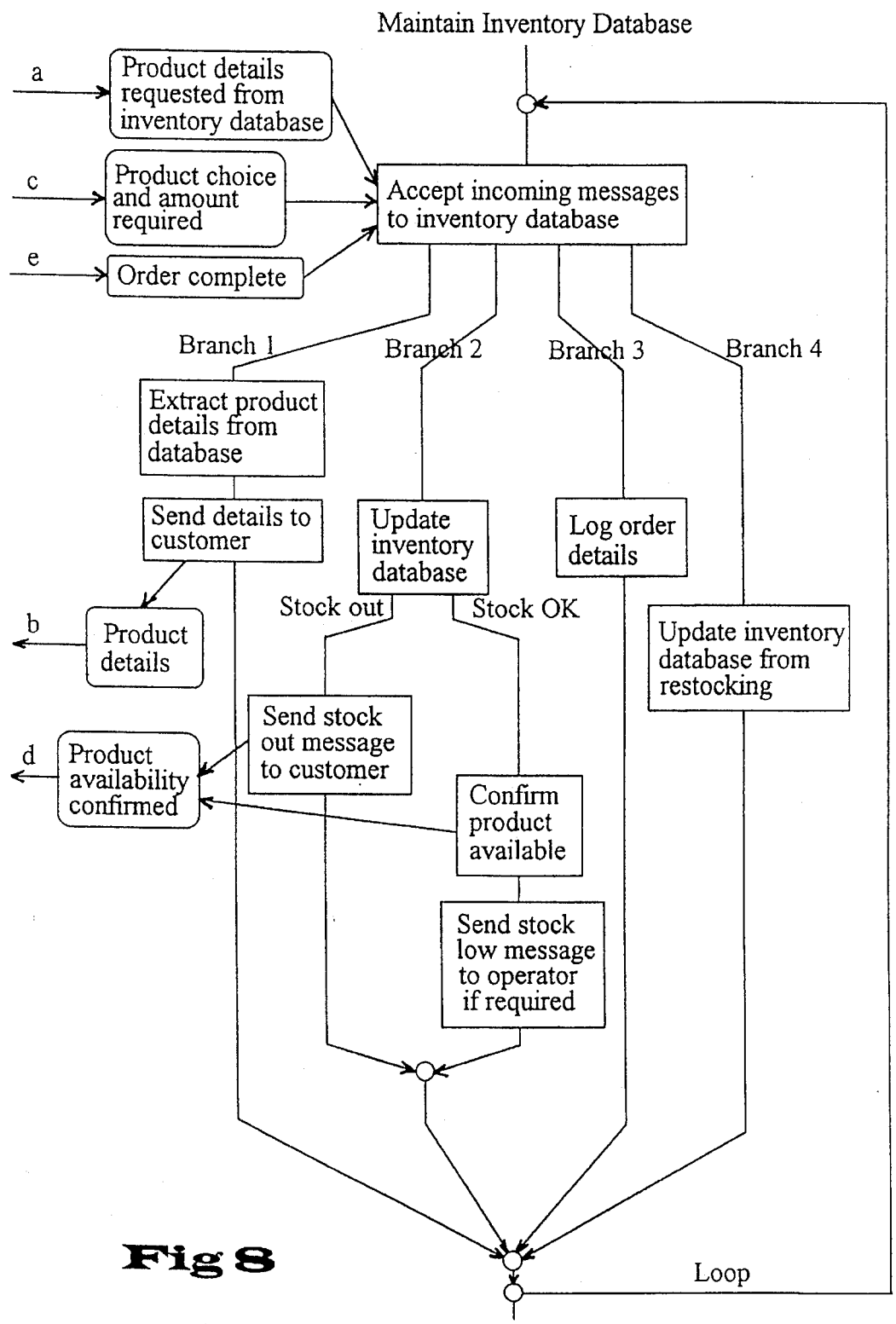

The process "Maintain Inventory Database" as detailed in FIG. 8 represents the process that continually maintains the inventory database.

This process waits for the reception of incoming messages from the customer order process with regard to requests for product details, selection of products for purchase and the indication of the customers order being completed.

Upon reception of a message requesting product details the inventory database process proceeds along branch 1 and extracts the relevant details from the database regarding the products offered. These details are then sent to the customer order process. The inventory database process then unconditionally loops back to the reception of incoming messages to the database system.

Upon reception of a product selection message from the customer order process, the inventory database process proceeds along branch 2 to establish the availability of the product selected. If there is no stock of the product available then a "stock out" message is sent to the customer. If the product is available then this is also indicated to the customer. If as a result of the product selection the stock of that product requires replenishing then a "stock low" message will be sent to an operator (not detailed). The inventory database process then unconditionally loops back to the reception of incoming messages to the database system.

Upon reception of an order complete message from the customer order process the inventory database process proceeds along branch 3 and logs the details of the customers complete order. The inventory database process then unconditionally loops back to the reception of incoming messages to the database system.

The inventory database process will also respond to manual inputs (not detailed) such as the replenishment of stock. In this case the process would proceed along branch 4 and update the database to accommodate the new stock level. The inventory database process then unconditionally loops back to the reception of incoming messages to the database system.

Figure 9:
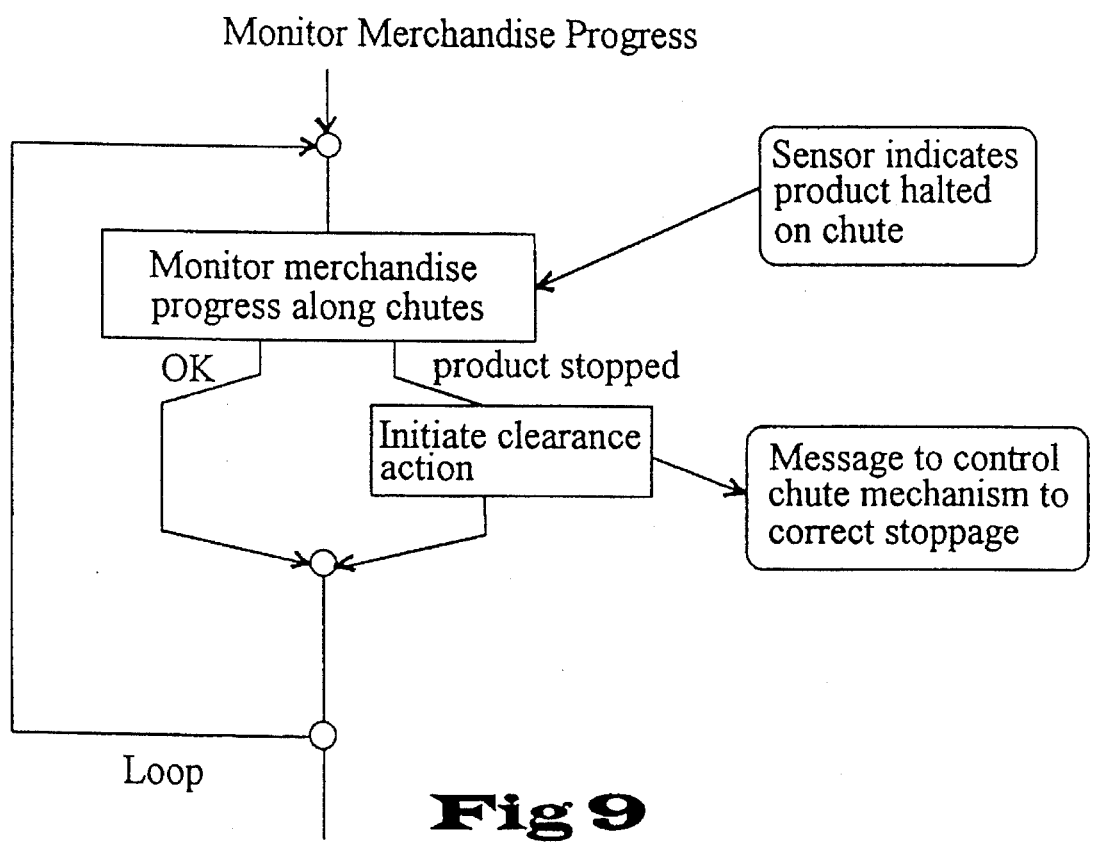

The process "Monitor Merchandise Progress" as detailed in FIG. 9 represents the process that continually monitors and maintains the progress of merchandise along the chutes.

This process receives messages from sensors on the chute system that will indicate whether or not goods have stopped on the chutes. If a message is received indicating a stoppage of goods then the process will initiate a clearance action and send a message to the chute control mechanism to correct the stoppage. The monitor merchandise process then unconditionally loops back to the reception of incoming messages from sensors.

The loading station may be associated with entertainment means, for example music or videos, news programmes, movies, documentaries and the like, and furthermore, advertising displays of the specials can be provided both at the order station and at the packing station.

It is already well known in the art that sales can be identified with computer technology so that the need to refill the respective compartments 39 can be signalled to an operator in the loading basement and quickly transferred to the relevant compartment 39.

After the initial packing of the non-perishable goods which would usually be carried in the compartments 39, the customer can choose to leave the complex by an "IMMEDIATE EXIT" end or choose to continue on to the next station which will be a "perishable goods" station. For customers who are driving their vehicles, the perishable goods may be visually seen through glass walls at eye level of a driver, who can study the qualities of displayed meats, vegetables, fruit and frozen goods. The driver will be assisted by a sales assistant who will remove the selected article and place it onto a further conveyor for delivery to a secondary packing station. The same area can be traversed by walk-through customers by walking along an aisle on the opposite side from the vehicles.

After the perishables have been loaded into the customer's car, the customer can then leave in an appropriate direction. Walk-through customers can conveniently leave in another direction where transport of a different type is available for transporting the customer and his goods.

It is visualised that some of the space presently occupied by parked vehicles can be used, for example, for gardens between the stations, and that area can be landscaped. In some instances, the stations will be separately covered by roofing, or can be all within one large roofed area.

I claim:

1. A merchandising method comprising customer identification and supply order of required articles by viewing one of a plurality of visual display units each of which identifies saleable articles at an associated one of a plurality of order stations each having a command facility, transmission of command signals from the command facility at said one station to at least one of a plurality of electronically controlled robots, withdrawal of said required articles from a storage facility by said at least one robot, transfer of said required articles to a packaging station by a transfer conveyor, command signals from each said command facility controlling each said robot independently of control from other of said command facilities, said transfer conveyor further comprising divisions which form side-by-side channels above said transfer conveyor, and respective release gates at the entry ends of said channels, and the method further comprising opening of each said gate after completion of withdrawal of required articles by a respective said robot to satisfy a said supply order.

2. Merchandising means comprising a visual display unit, electronic imaging means coupled to said display unit by an electrical circuit which comprises a scroll facility which sequentially scrolls images and intelligence identifying articles of merchandise on a screen of said display unit, a command locality having command switches adjacent to and electrically coupled to said display unit, a floor overlying a loading basement, a hollow upstanding structure surmounting said floor, a surface defining an opening in said floor coaxial with said structure, an elevator having a loading platform and being movable upwardly into the hollow of said structure from said loading basement, said structure comprising a storage facility containing shelves and divisions defining a grid of storage compartments, a plurality of robots each having driving means electrically coupled to and controlled by command switches, said compartments being accessible by said robots, a descent conveyor external of said structure but accessible by said robots for depositing articles from said compartments onto said descent conveyor, a packaging conveyor, and a transfer conveyor operative between said descent conveyor and said packaging station to transfer articles released onto said transfer conveyor by said descent conveyor and transfer to said packaging station, and a plurality of upstanding columns spaced circumferentially around said structure, a plurality of robot carriage guides each extending between adjacent columns, said robots being movable along a respective said robot carriage guide, each said robot carriage guide terminating in elevating carriages which engage surfaces of said columns for vertical movement.

* * * * *